United States Patent [19]

Solomon

[11] 4,341,521
[45] Jul. 27, 1982

[54] PSYCHOTHERAPEUTIC DEVICE

[76] Inventor: Laura B. Solomon, 150 Prospect Park W., Brooklyn, N.Y. 11215

[21] Appl. No.: 238,669

[22] Filed: Mar. 2, 1981

[51] Int. Cl.³ .............................................. G09B 19/00
[52] U.S. Cl. ................................................. 434/236
[58] Field of Search ............... 434/236, 237, 156, 167, 434/168, 178

[56] References Cited

U.S. PATENT DOCUMENTS

| | | | |
|---|---|---|---|
| 1,451,108 | 4/1923 | Post | 434/178 |
| 1,563,582 | 12/1925 | McDade | 434/178 |
| 3,779,557 | 12/1973 | Kritzberg et al. | 434/236 X |
| 3,891,209 | 6/1975 | Kritzberg | 434/236 X |
| 3,940,863 | 3/1976 | Kritzberg | 434/236 |
| 4,063,369 | 12/1977 | Hart | 434/156 |
| 4,216,594 | 8/1980 | Farley et al. | 434/236 |

Primary Examiner—William H. Grieb
Attorney, Agent, or Firm—Marvin Feldman; Stephen E. Feldman

[57] ABSTRACT

A psychotherapeutic device for use by a therapist with a non-verbal or resistant child subject, is provided wherein the child is shown a page of a book depicting a dramatic if not traumatic scene relevant to the child's life. A series of puppets depicting a character of like gender to the subject child, is provided juxtaposed to the page, and wherein each of the puppets displays a different emotion. The child reads or is read a story related to the scene and asked to place or affix the character puppet into the scene, which puppet exhibits the emotion that the child believes the character is feeling.

16 Claims, 3 Drawing Figures

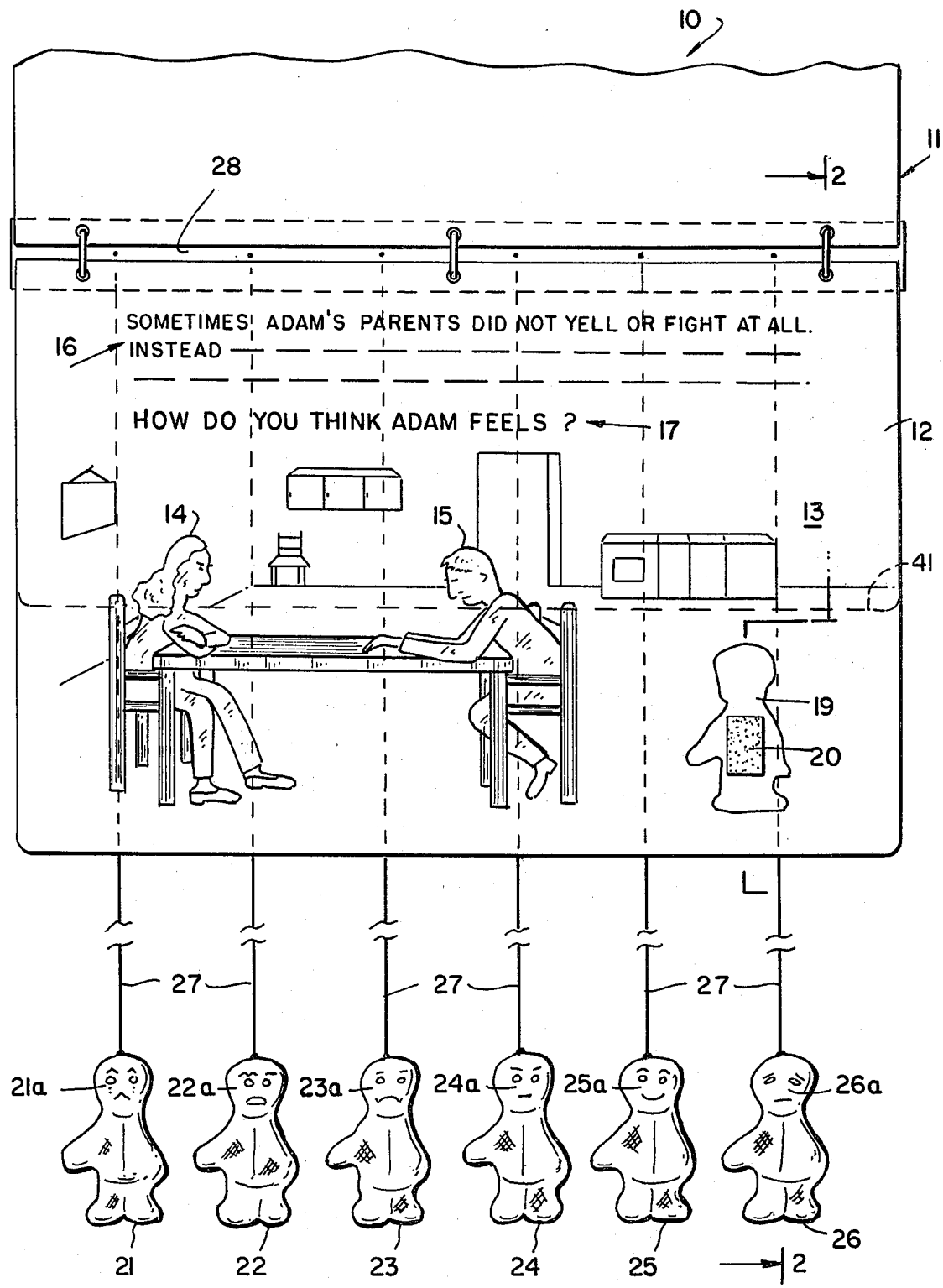

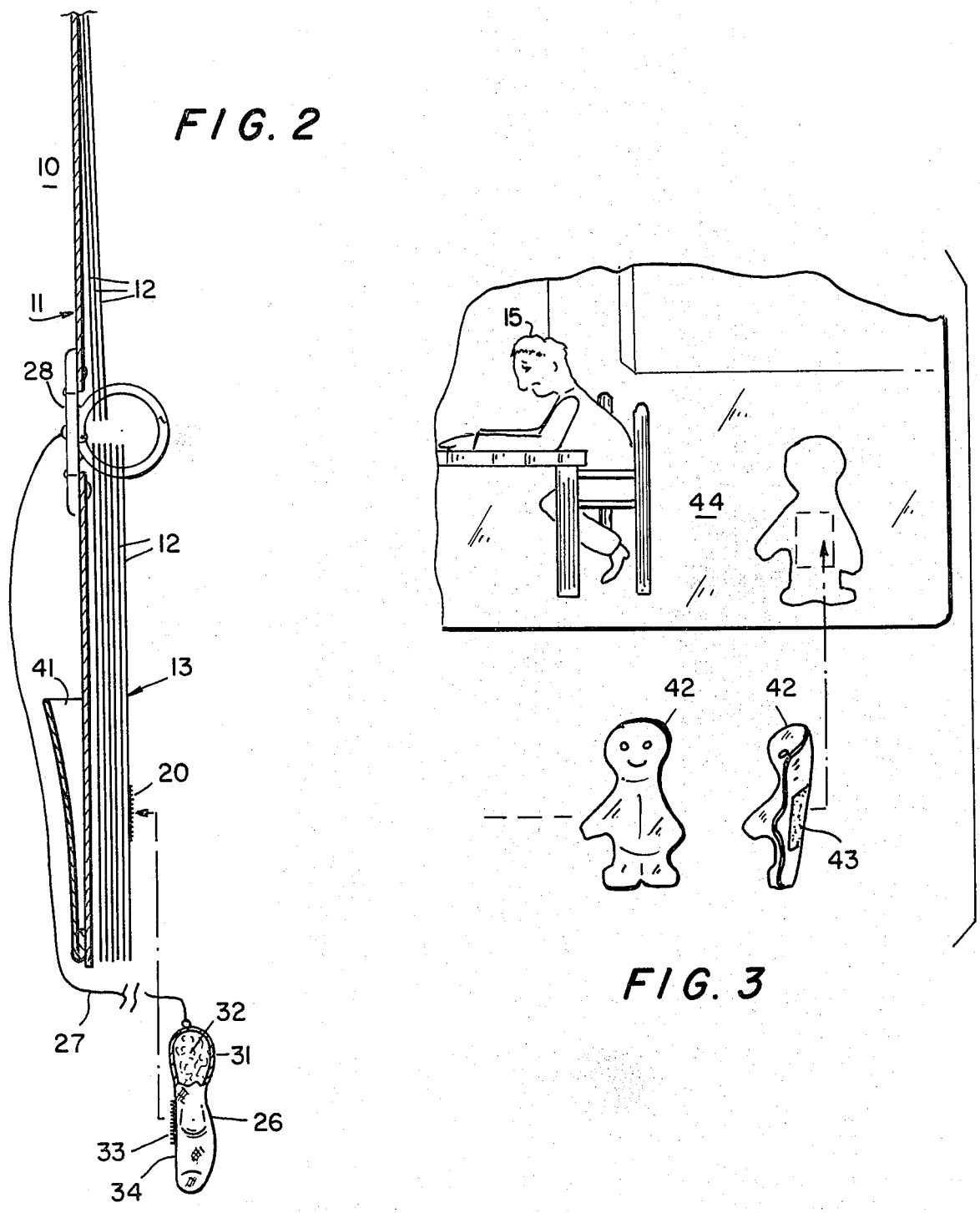

PSYCHOTHERAPEUTIC DEVICE

FIELD OF THE INVENTION

This invention relates to a psychotherapeutic device. Specifically this invention relates to a psychotherapeutic device to assist the therapist in dealing with children, particularly non-verbal or resistant children.

BACKGROUND AND DISCUSSION OF PRIOR ART

The professional therapist often encounters difficulty in helping the young and/or resistant child, whose tendency to be uncommunicative renders the child less susceptible of benefiting from the therapy process. This is particularly so wherein the child is encountering intrafamily problems, such as the divorce of his parents.

It was thus desired in the prior art to provide a means to bridge this communication gap between therapist and child, and to focus on the problems in a non-threatening manner.

In U.S. Pat. No. 3,779,557, granted Dec. 18, 1973 to Kritzberg, et al., and in U.S. Pat. No. 4,216,594, granted Aug. 12, 1980 to Farley, et al., there are disclosed psychological testing games.

Now there is provided by the present invention a psychotherapeutic device wherein a storybook setting depicts a traumatic event in the child's life, and through the storybook model the child is encouraged to complete the storybook by selecting a puppet figure exhibiting an emotion which the child feels is apt for the particular event in the puppet's, ergo the child's life.

It is therefore a principal object of the present invention to provide a psychotherapeutic device for use by the therapist with a non-verbal and/or resistant child.

It is another object of the present invention to provide a psychotherapeutic device as aforesaid which is a diagnostic aid to the therapist.

It is still a further object of the present invention to provide a psychotherapeutic tool-book for the therapist, wherein through a story telling or character model the subject child is stimulated to communicate in areas wherein the child would otherwise be reluctant to discuss.

It is still another object of the present invention to provide a psychotherapeutic tool-book, which is useful in a broad range of situations, and yet which is relatively inexpensive to manufacture.

BRIEF SUMMARY OF THE INVENTION

Broadly speaking, the present invention may be said to comprise a sheet depicting a dramatic scene in the child subject's life, so that a therapist can tell or the child subject can read a story related to the scene, and wherein the scene contains a region for securing a figure, with the figure being selected from a plurality of like figures of the same character, but each figure displaying a distinctly different emotion, with the figure being formed with means so that the child can select a figure and place the figure within the region, thereby indicating to the therapist the character's, ergo the child's feeling. In a more specific aspect the present invention is loose-leaf tool-book containing a plurality of sheets dealing with specific related traumatic events, such as the dissolution of the child subject's parent's marriage, and wherein the character figures are puppets juxtaposed to the sheets.

BRIEF DESCRIPTION OF THE DRAWINGS

FIG. 1 is a plan view of one page of the loose-leaf tool-book with the series of character puppet figures juxtaposed to the sheet;

FIG. 2 is an enlarged partial sectional view taken along line 2—2 of FIG. 1; and FIG. 3 is partial fragmental plan view of an alternate embodiment of the character figures.

DESCRIPTION OF THE PREFERRED EMBODIMENTS

Referring to FIGS. 1 and 2 there is shown the psychotherapeutic tool-book of the present invention generally referred to as number 10. Tool-book 10 comprises a loose-leaf book 11 of conventional binder construction. Book 11 contains a plurality sheets or pages 12, with the face 13 of one page 12 being depicted in full plan view. A scene containing animated adult male and female character figures 14 and 15, respectively, are depicted on the face 13 of page 12, which scene represents a traumatic event, such as the dissolution of the marriage of the adults. A simple narrative 16 describing the event appears at the top of the page, and is followed by a question 17 referring to the fictitious child of the character. An outlined space or region 19 is formed juxtaposed to the figure in the scene, and a Velcro pad 20 is affixed within the space, for reasons hereinafter appearing.

A series of six puppets 21, 22, 23, 24, 25 and 26 are affixed to strings 27 (typical) and the strings in turn affixed to the loose-leaf rib 28 (FIG. 1). Each puppet 21–26 depicts the same character, which preferably would be of like gender to the child subject, which character exhibits a facial expression displaying a particular emotion. The specific emotions depicted for the puppets are sadness 21a, anger 22a, depression 23a, confusion 24a, satisfaction 25a and disappointment 26a. It is also within the contemplation that the character depicted on puppets 21-26 be otherwise non-descript and provide a culturally neutral or indeterminate appearance, so that the child subject, regardless of his/her social, cultural, racial or ethnic background could readily identify with the character figures. Likewise, the adult figures in the depicted scene would be culturally neutral.

Each puppet may be formed of cloth 31, with cotton stuffing 32 to provide a pleasing tactile aspect for the child. A Velcro hooking pad 33 is affixed to the rear 34 of each puppet for affixing the puppet to Velcro pad 20 on the face 13 of page 12. At the rear of the loose-leaf book is a pocket 41 for receiving the puppets when not in use. The puppets are secured to the loose-leaf binder by the aforesaid strings 27.

In this manner of construction the therapist first arranges a specific plurality of sheets dealing with a specific traumatic event or events in the subject child's life. Puppets are then arranged below the first page as depicted in FIG. 1. The therapist then reads or the child reads the printed story line above the picture, and the question is posed to the child subject as to what feeling "Adam" (i.e. the puppet representing the child) would likely display. The subject child then examines and holds perhaps each of the puppets and then decides what "Adam" is feeling, and attaches the selected puppet in and to the outlined region. The sequence is repeated for a number of related incidents or scenes, until the therapist has acquired the necessary insight into the subject child's thinking.

The soft tactile nature of the puppet assists in having the child respond. However, it is also within the contemplation of the present invention that other puppet or figure forms may be used including by way of example a plastic cut-out figure 42 with a pressure sensitive releasable adhesive 43 which is applicable to an imprinted plastic page 44 (FIG. 3). Colorform construction is also within the contemplation of the invention.

Another construction variation of the present invention is to have culturally neutral adult figures which display various emotions and have the child select the (i.e. his) parent's emotional response to the character's (i.e. his) selected emotional display.

It is to be understood that while the scenes depicted and discussed within relate to divorce, other child trauma situations, such as school, hospital, death, and serious illness are also with the contemplation of the present invention.

There is thus described a psychotherapeutic device which is useful which children of ages 5 to 12, and preferrably 5 to 10, and is particularly useful with resistant, non-verbal and emotionally handicapped children.

One skilled in the art will realize that there has been disclosed a psychotherapeutic tool-book that engages the withdrawn, resistant, or uncooperative child, as well as the non-verbal child into therapeutic involvement, provides a diagnostic aid for a therapist, stimulates insight, facilitates communication, and aids in personal growth, and is relatively inexpensive to manufacture.

While there has been described what is at present considered a preferred embodiment of the invention, it will be obvious to one skilled in the art that various changes and modifications may be made therein without departing from the invention, and it is, therefore, aimed in the appended claims to cover all such changes and modifications as followed in the true spirit and scope of the invention.

What is claimed is:

1. A psychotherapeutic device comprising; a sheet having a scene depicted thereon so that a therapist can tell a story to a subject child relative to said scene, and a region disposed within said scene, further comprising a plurality of members depicting a like character and wherein each of said members depicts said character displaying a specific different emotion, said members being formed so as to be selectively received in said region, whereby the subject upon viewing the scene in light of the story selects one of said members and places the member in said region thereby conveying the emotion felt by the subject child relative to the scene.

2. The psychotherapeutic device of claim 1, wherein said character depicts a child of like gender to the character, and wherein the scene depicts a traumatic event in the child's life.

3. The psychotherapeutic device of claim 2, further comprising a plurality of said sheets each depicting a different event.

4. The psychotherapeutic device of claim 3, said members and said regions being formed with cooperative attachment means for selective attachment of the member within the region.

5. The psychotherapeutic device of claim 3, further comprising a book and means to selective insert and remove certain of said sheets in said book so as to tailor the book to the specific child subject.

6. The psychotherapeutic device of claim 5, further comprising means to attach said members in said book so that said members are arranged juxtaposed to each sheet when being viewed by the child subject, and said members are placable in said region while remainig attached to said book.

7. The psychotherapeutic device of claim 6, said book further comprising means to store said members with the book closed.

8. The psychotherapeutic device of claim 4, said members comprising puppets.

9. The psychotherapeutic device of claim 8, said puppets being formed with attachment means on the side opposite the face of the character, and said region being formed with cooperative attachment means, so as to permit selective attachment of the puppet within the region.

10. The psychotherapeutic device of claim 2, said scene comprising characters of adults.

11. The psychotherapeutic device of claim 2, said scene further comprising verbiage relative to the story of said scene.

12. The psychotherapeutic device of claim 5, said book being a loose-leaf binder and said sheets comprising loose-leaf pages.

13. The psychotherapeutic device of claim 6, said attachment means to said book comprising a plurality of strings, each of said strings being attached at one end to a respective member and at the other end to said book.

14. The psychotherapeutic device of claim 1, one of said characters being an adult figure.

15. The psychotherapeutic device of claim 14, wherein another character depicts a child and wherein the subject is a child of like gender to the latter said, character, and wherein the scene depicts a traumatic event in the child's life.

16. The psychotherapeutic device of claim 1, said plurality of depicted emotions comprises at least two selected from sadness, anger, depression, confusion, satisfaction and disappointment.

* * * * *